(12) United States Patent
Mei et al.

(10) Patent No.: US 11,379,874 B1
(45) Date of Patent: Jul. 5, 2022

(54) RECOMMENDING UNIQUE PRODUCT INVENTORY

(71) Applicant: Airbnb, Inc., San Francisco, CA (US)

(72) Inventors: Shike Mei, San Carlos, CA (US); Teng Wang, Millbrae, CA (US); Shawn Chen, Millbrae, CA (US); Ganesh Venkataraman, Mountain View, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

(21) Appl. No.: 16/370,560

(22) Filed: Mar. 29, 2019

(51) Int. Cl.
*G06Q 30/02* (2012.01)
*G06Q 30/06* (2012.01)

(52) U.S. Cl.
CPC ..... *G06Q 30/0254* (2013.01); *G06Q 30/0249* (2013.01); *G06Q 30/0645* (2013.01)

(58) Field of Classification Search
CPC .................................. G06Q 30/02; H04L 67/20
See application file for complete search history.

(56) References Cited

U.S. PATENT DOCUMENTS

| | | | | |
|---|---|---|---|---|
| 2008/0005313 A1* | 1/2008 | Flake | ...................... | H04L 67/20 709/224 |
| 2009/0313120 A1* | 12/2009 | Ketchum | ............... | G06Q 30/02 705/14.51 |
| 2011/0131160 A1* | 6/2011 | Canny | .................... | G06Q 30/02 706/12 |

\* cited by examiner

*Primary Examiner* — Saba Dagnew
(74) *Attorney, Agent, or Firm* — Morgan, Lewis & Bockius LLP

(57) ABSTRACT

One of more unique products can be selected for advertisement over a digital marketing channel. The selection is based on the calculation of a base impression budget, calculated per product per day, which calculation considers information related to a product, including supply and demand at the market level, characteristics of the property, and popularity of the listing. A real-time, or current, impression budget is calculated to determine whether a particular product should be recommended to a user. Every time the product is advertised to a user, a user intent value is calculated, indicating the user's likelihood of purchasing the product within a given period of time, along with the user intent of every user to which the product has been advertised. The user intent calculation may consider information specific to the user, such as the user's activity history and profile. These user intent values are subtracted from the base impression budget to obtain a real-time impression budget. If the real-time budget is greater than zero, the product will be advertised to a user. By these means, a bound is set on the number of times a product may be advertised before it is assumed to be sold.

17 Claims, 4 Drawing Sheets

RECOMMENDING UNIQUE PRODUCT INVENTORY

BACKGROUND

As a user of a digital environment interacts with a merchant (such as an e-commerce provider), the merchant may wish to display to the user one or more product recommendations that may be of interest to the user. This display may be done, for example, as a digital advertisement transmitting to the user an image of, or information about, the recommended product(s). In order to encourage the user to make a purchase, merchants generally wish to target their advertising to items that would be attractive to the user, and therefore, the process of selecting product recommendations is increasingly important. In one known method for generating product recommendations, an advertiser may consider whether a product is popular, and therefore broadly appealing to a large number of users. In some instances, the recommendations may be targeted to one specific user, for example through a supervised learning model that trains against a set of data regarding a user's search history. Through either of these methods, a set of product recommendations may be generated with products that would in theory appeal to a user.

Products that are highly desirable to a user are often broadly popular, so as to appeal to many users. If the same broadly appealing product is advertised to a large number of users, more than one of those users may decide to purchase the product. Therefore, known methods for recommendations, such as those that recommend the most popular products, are generally effective when marketing products that are available in large quantities. For example, e-commerce providers such as Amazon often deal with large quantities of a single particular product, and may therefore advertise a product to many users, knowing that each user, if interested, has the individual opportunity to purchase the product. However, in circumstances where inventory for a product is scarce or the product is wholly unique, the practice of broadly advertising a product has several downsides. Initially, in the case of unique products, the products that are most appealing (or most broadly appealing) are also the most likely to be unavailable, as they are quickly purchased. If such products are continued to be advertised after purchase, a user may experience frustration that their desired product is sold out or otherwise unavailable. While such advertisements may still drive traffic to a merchant's website or e-commerce portal, the user lured to the merchant's website in search of a particular advertised product may be less likely to make a purchase, if they must wait for the product to become available. Additionally, repeated lack of availability may lead to loss of goodwill, as users may feel that false or misleading advertisements were made. However, a solution focused on advertising less popular products that are more likely to be available may also be flawed. An advertised product must still be appealing to a user viewing the advertisement, in order to draw their interest and business to the merchant's website. Still further, solutions that "hold" or reserve a product for a user's consideration may be giving up opportunities for sales to other individuals, if the user ultimately decides not to purchase the product.

One type of advertiser that may wish to place advertisements is an online reservation system that provide listings of properties, such as houses, condominiums, rooms, apartments, lots, and other real estate, offered for reservation (sometimes referred to as a "booking" or "rental") for a specified time period (e.g., a day, week, month, or other period of interest). An online reservation system may display reservable properties to guests as property "listings," which contain respective information about the property such as price ranges, dates, number of bedrooms, and/or other factors that may be of interest to guests in making a reservation. Any single property may only be booked once within a certain time period by a single user, and typically, may not be booked more than once a day. Accordingly, a reservation for a property for a given day (or other period of time) may be understood as a unique, single-quantity product for purchase.

Typical recommendation systems do not take scarcity of product into consideration. Accordingly, if popular products (such as the most popular properties and/or the most popular booking times) are consistently advertised, the percentage of users who may purchase the product, of those who are advertised to, is highly limited, as inventory will be quickly exhausted. This is true of any market for unique products, for example, limited rentals, art or custom items, or time-sensitive services, among many other markets.

Further techniques for making efficient recommendations to users that lead the purchase of more unique products, and for delivering advertisements to users based on their personalized requirements and product availability, are therefore generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure.

DETAILED DESCRIPTION

The present invention generally pertains to systems and methods for improving the selection of unique products for advertisement over a digital marketing channel, based on a calculation of user intent to purchase and an upper limit on a number of times an advertisement for a particular product is to be displayed. In one embodiment, a base impression budget is calculated, per product per day, based on information related to a product, such as supply and demand at the market level, characteristics of the property, and/or popularity of the listing. In one embodiment, every time the product is advertised to a user, a user intent value may be generated, representing the user's likelihood of purchasing within a given (e.g., 24-hour) period of time. This may be done for every user that the product is advertised to. The user intent model may consider information specific to the user, such as their activity history and profile.

In one embodiment, the impression budget is a dynamic, modifiable value that can be calculated in real-time as a "score" for the product. A dynamic budget allocator calculates a real-time (viz., current) impression budget, setting a number of "impressions" that may be made when advertising the product. This calculation is performed based on the user intent and the base impression budget. The base impression budget (the initial score) may be decreased in value with every unique advertisement of the product to a user, and therefore, the budget is representative of the product's exposure to the target audience for purchase. When the impression budget goes down to zero, it may be assumed that a sufficient number of advertisements were delivered such that a purchase was made or that a purchase is imminent or highly likely. Accordingly, once the impression budget drops to zero, no additional advertisements are made, and the product will no longer be included on any set of recommended products. If, at any time, the product is purchased, the impression budget is set to zero.

In one embodiment, a supervised learning model considers a user's history of activity with the advertiser (e.g., their search history) as well as the real-time impression budget for each potential product that may be advertised, and develops, from the total set of advertisable products, a subset of one or more recommended products for the target user. In one embodiment, this subset may be sorted in an order in which it may be advertised to the user, or one product from the subset is selected to be advertised.

Figure 1:
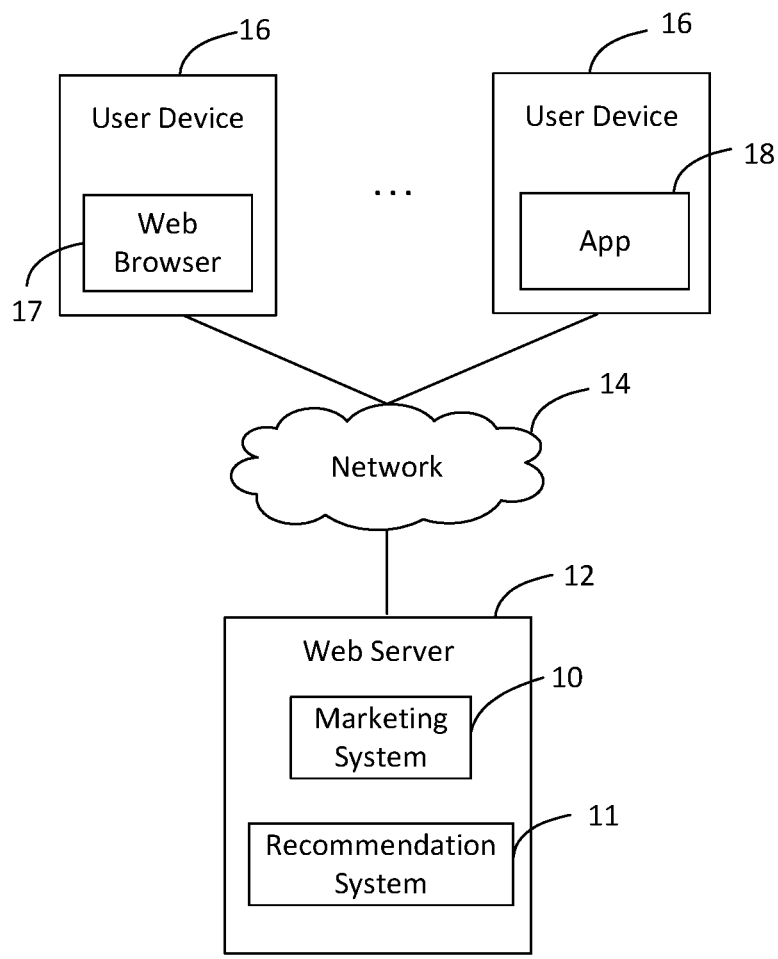
FIG. 1 is a block diagram illustrating a recommendation system in accordance with some embodiments of the present disclosure.

FIG. 1 depicts, in accordance with an embodiment of the present disclosure, a recommendation system 11 for generating a set of recommended products to advertise to a user (a potential customer) and a marketing system 10 for delivering one or more advertisements to a user directed to a recommended product, through one of a plurality of digital media (also referred to herein as "marketing channels"). As shown in FIG. 1, the marketing system 10 and the recommendation system 11 may be implemented by a web server 12 or other type of device or system that is connected to a network 14. Network 14 may comprise one or more network types, such as a local area network (LAN) or a wide area network (WAN). In some embodiments, the network 14 comprises at least the Internet, but other types of networks or combinations of networks are possible in other embodiments. Marketing system 10, recommendation system 11, and web server 12 are managed or facilitated (and in some embodiments, owned) by an advertiser. An advertiser may be generally understood as an individual or organization interested in delivering a marketing communication (typically an advertisement) for a product, service, or the like, to a potential customer via a marketing channel. In some embodiments, the advertiser may be a merchant or entity that uses or runs an e-commerce website or app, through which customers may buy, sell, rent, lease, and/or otherwise purchase or subscribe to the advertiser's products or services. In one exemplary embodiment, the advertiser may provide an online reservation system that shows listings of properties, such as houses, condominiums, rooms, apartments, lots, and other real estate that has been offered for reservation and that may be reserved for a specified time period (e.g., a day, week, month, or other period of interest). In such a scenario, an advertiser may display to the user an advertisement containing information for a particular property, and the activity of a user in response to an advertisement may include the booking of that property during a specified time period. In some embodiments, the activity of the user may include viewing a webpage or listing specific to the advertised product or property, or other interactions with the advertiser's website or e-commerce interface, such as searching or filtering against an index of products or properties, among many other things.

As shown in FIG. 1, a plurality of user devices 16 may be used by individuals or entities (referred to herein as "users") to access, view, and/or take action in response to content delivered to the user from the web server 12. Each user device 16 may be implemented by one or more computing devices, such as a smartphone or other hand-held device (e.g., a tablet or reader), desktop computer, laptop computer, or any other appropriate device capable of receiving, processing, and outputting digital information. In a preferred embodiment, the user device presents information to a user via a display, and takes input from the user in relation thereto (for example, through interactive graphics or hyperlinks) via a touchscreen, mouse, keyboard, stylus, or any other appropriate input device. As shown by FIG. 1, each user device 16 may have installed a web browser 17 and/or other appropriate applications 18 that can be used to communicate (receive and transmit) with the web server 12 via the network 14. In some embodiments, app 18 may be a mobile application or other software application distinct from a generic web browser, such as an e-mail, messaging, or social media application, an application specific to the advertiser or an e-commerce business, or another program capable of receiving digital content from the marketing system 13 and delivering such content to the user of the device. While FIG. 1 illustrates a one-to-one correspondence between a user device 16 and one of a web browser 17 or app 18, the preferred embodiment is not so limited. For instance, a user device 16 may in one embodiment be a smartphone on which several apps 18 are installed (e.g., Facebook, web browser, e-commerce app, etc.), each of which may serve as a channel over which advertisements may be displayed. Further, while FIG. 1 illustrates only two user devices 16 connected to network 14, it can be understood that any number of users may be connected in different embodiments.

In some embodiments, the web server 12 may deliver one or more advertisements directed to a single product or a set of products, each advertisement being displayed by a user device 16 via the browser 17 and/or app 18. Advertisements and other marketing content may be delivered to users directly or indirectly through a third-party service that delivers the advertisement, which is provided or instructed to the third-party by the advertiser. In some embodiments, the advertisements delivered to the user device 16 are advertisements selected for and/or targeted to the user that owns or uses the device 16. In a preferred embodiment, the advertisements are directed to one or more products of a set of products recommended to that user by the advertiser.

Figure 2:
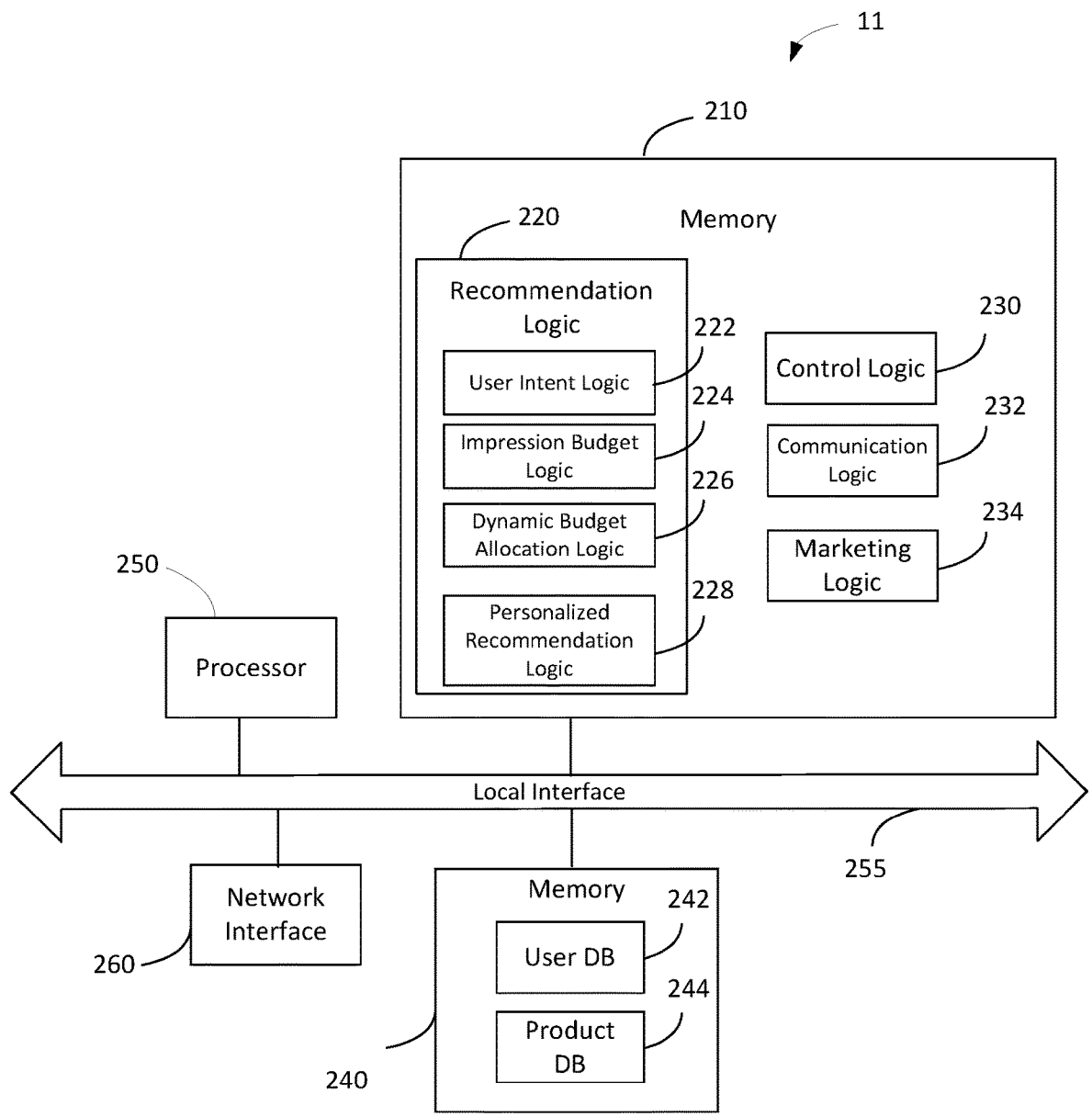
FIG. 2 is a block diagram illustrating a recommendation system in accordance with some embodiments of the present disclosure.

FIG. 2 depicts an example schematic diagram of components of recommendation system 11 in accordance with some embodiments of the present disclosure. The recommendation system 11 may include a memory 210 and a memory 240. As used herein, memories 210 and/or 240 may refer to any suitable storage medium, either volatile and non-volatile (e.g., RAM, ROM, EPROM, EEPROM, SRAM, flash memory, disks or optical storage, magnetic storage, or any other tangible or non-transitory medium), that stores information that is accessible by a processor. Memories 210 and 240 may store various instructions used in the systems and methods described herein. While FIG. 2 illustrates a memory 210 and a memory 240 that are discrete units, it will be understood that the embodiments described herein are not limited to a particular arrangement and that other embodiments may store information in one combined memory, or with information stored in a different configuration in one or more memories, some local to the other components illustrated in FIG. 2 and/or some shared with, or geographically located near, other computing systems. In the illustration of FIG. 2, memory 210 stores a recommendation logic 220, the recommendation logic containing one or more logics for developing a set of product recommendations for advertisement to a user. In particular, recommendation logic 220 may include a user intent logic 222, an impression budget logic 224, a dynamic budget allocation logic 226, and a personalized recommendation logic 228. The capabilities of these various logics are described in greater detail below.

The recommendation system 11 may include control logic 230 for generally controlling the operation of the recommendation system 11, and marketing logic 234 for delivering advertisements to users via any of a variety of digital marketing channels, the advertisements being directed to one or more recommendations generated by the recommendation logic 220. The memory 210 may also, in one embodiment, include communication logic 232 for obtaining information from or communicating information to a variety of third-party systems via network 14 (FIG. 1). Furthermore, the recommendation system 11 may have a network interface 260 used by the communication logic 232 to exchange data over the network 14. While communication logic 232 is illustrated as being a separate logical component, in an alternative embodiment, the recommendation system 11 may include communication logic 232 as part of recommendation logic 220 or control logic 230. In another alternative embodiment, the communication logic 232 may communicate with third-party systems and may coordinate with the control logic 230 to read or write data to memory 240 or to another data repository (not shown) within the computing systems that make up the server 12.

Memory 240 may be configured, in some embodiments, to include a user database 242 that stores information and metrics related to one or more users in relation to their profile and/or activity with the advertiser's systems. Memory 240 may also include a product database 244 that stores information and metrics related to individual products (e.g., property listings). Both the user database 242 and the product database 244 may be generally understood to contain information specific to the advertiser and/or the user's interactions therewith. The various described logics stored in memory 210 may read data from or write data to the user database 242 or the product database 244 as part of their respective calculations.

In some embodiments, the recommendation system 11 may be implemented in whole or in part as a machine learning system (e.g., neural network software) for achieving the functionalities described herein. In one embodiment, one or more of user intent logic 222, impression budget logic 224, dynamic budget allocation logic 226, and personalized recommendation logic 228 of the recommendation logic 220 (or any subset of any of those logics) may be implemented at least in part as one or more machine learning algorithms, as described in more detail below.

While, in the preferred embodiment, each of recommendation logic 220, control logic 230, communication logic 232, and marketing logic 234 is depicted as part of recommendation system 11, these logical components need not be so configured, and in other embodiments, other configurations of the various components, within recommendation system 11 or distributed over one or more computing systems, are possible. Recommendation logic 220, communication logic 232, control logic 230, and marketing logic 234 may be variously implemented in software, hardware, firmware or any combination thereof. In the exemplary recommendation system 11 shown in FIG. 2, recommendation logic 220, control logic 230, communication logic 232, and marketing logic 234 are implemented in software and are stored in memory 210 of the recommendation system 11. Note that these components, when implemented in software, can be stored and transported on any non-transitory computer-readable medium for use by or in connection with an apparatus (e.g., a microprocessor) that can execute instructions. In the context of this disclosure, a "computer-readable medium" can be any device or system that can contain or store a computer program for use by or in connection with an instruction execution apparatus.

The logics of the exemplary recommendation system 11 depicted in FIG. 2 may be executed by one or more conventional processing elements 250, such as a central processing unit (CPU), digital signal processor, other specialized processor or combination of processors, or other circuitry that communicates to and drives the other elements within the recommendation system 11 via a local interface 255, which can include at least one bus. As an example, the processing element 250 may execute instructions of software stored in memory 210, such as control logic 230, recommendation logic 220, communication logic 232, and marketing logic 234. While FIG. 2 illustrates one processor 250 which implements all of the various logics in the recommendation system 11, it is possible in other embodiments for the system 11 to employ multiple processors. In one such alternate embodiment, discrete processing elements may be used for each of (or any subset of) user intent logic 222, impression budget logic 224, dynamic budget allocation logic 226, and personalized recommendation logic 228, or any portions of those logics. In some embodiments, the processing of system 11 is not limited to being performed by a processing element connected to the local interface 255, but instead, processing in support of the various logics of recommendation logic 220 may be distributed over one or more computer systems that may be remotely located. In some embodiments, the processing element 250 may comprise an artificial neural network or other type of configuration for performing machine learning functions based on instructions stored in memory 210.

Figure 3:
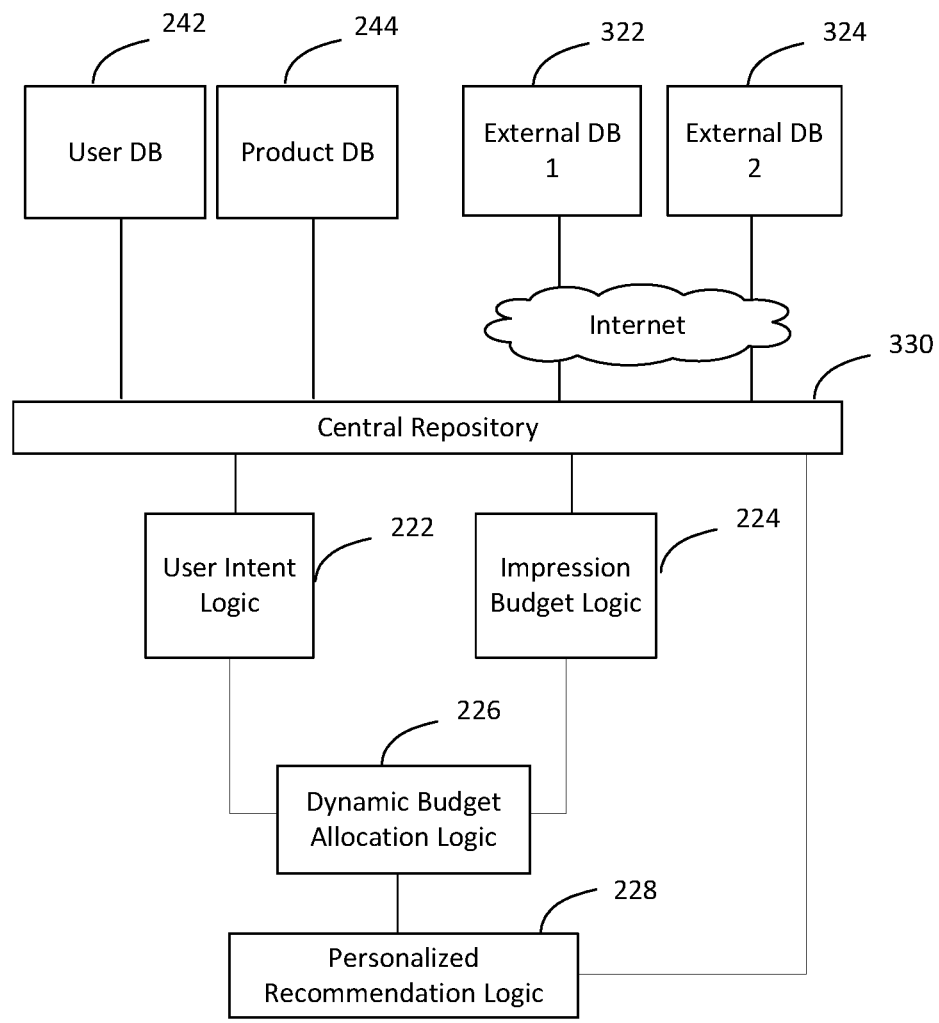
FIG. 3 is a block diagram illustrating a system for generating recommendations for a user, in accordance with a first embodiment of the present disclosure.

FIG. 3 illustrates an exemplary configuration of a system and method for generated recommended product listings. With reference to FIG. 3, information about a user's profile on the advertiser's computer system(s) and/or interaction with an advertiser is stored in the user database 242 and information about a product and/or its listing with the advertiser is stored in the product database 244. In the example of FIG. 3, external database 1 is a repository, managed by a third-party, that stores data directed to a first digital channel (such as, e.g., advertising channels such as Google Ads, Facebook, and Instagram, third-party websites relevant to the advertiser's market (e.g., travel websites, news sites, or content aggregation websites), or social media websites and applications, among others), an external database 2 is a repository, managed by a third-party, that stores data directed to a second digital channel (different from the first digital channel, but of the same general types mentioned above with regard to the first channel). In a preferred embodiment, data from each of these internal and external sources is pulled and stored in a central repository 330 for ease of access by the recommendation system 11 during calculations related thereto, however, in other embodiments, the user database 242, product database 244, and external databases (or "third-party databases") 322 and/or 324 may wholly or partially transmit data directly to the user intent logic 222, impression budget logic 224, dynamic budget allocation logic 226, or personalized recommendation logic 228, or any subset thereof. It will be understood that the embodiments herein do not necessary need to correspond to a particular number or configuration of internal and/or external databases, so long as information can be collected regarding advertisement of a product to users over all relevant third-party channels and a user's activity on the advertiser's servers.

The data stored in product database 244 and external databases 322 and 324 is related to one or more customers or target customers of the advertiser. Here, "customer" or "user" may correspond to any person or entity that the advertiser wishes to target with a marketing communication to encourage purchase of a product, even if no purchase is ultimately made. The data stored in databases 244, 322, and 324 may include information about marketing communications (viz., advertisements) delivered to the user and/or data associating a customer's action(s) to a particular marketing communication. An advertisement may take a variety of forms, such as a written, graphical, video, or another type of communication, as long as the advertisement is directed to a particular product or set of products offered for purchase/rental/lease/etc. by the advertiser. For some embodiments, an advertisement contains information (such as, e.g., a photo and/or a price) specific to a product, and may contain a hyperlink, discount code, or other information motivating the user to purchase the particular advertised product.

In a preferred embodiment, system 11 may access data from third-party databases 322 and 324 via communication logic 232 (FIG. 2). Communication logic 232 may use APIs provided by those third-party entities managing the databases 322, 324 to obtain their respectively stored data, however, other methods of data collection may alternatively be used. This third-party data may include, for example, information indicating whether and when one or more advertisements were delivered to user (that is, the timing of the occurrence of a marketing communication(s)) and click/view/share data comprising a number and timing of user clicks/view/share made for a particular marketing communication on the marketing channel, the number of impressions of the advertisements on the user, the length of time for which the advertisement is displayed to the user and/or the ad is viewed, the position of the ad on the user's display, among other things. The data in the third-party databases may also, in some embodiments, include the user's activity on the third-party channel generally, such as the user's search history, among other things. In some embodiments, this data may also include collected information about the user, such as, e.g., information collected from cookies, GPS or location data, device data (e.g., operating system or device make/model) or other data customarily made available by a customer's device(s), application(s), opt-in preferences, and/or user information publically shared with/over the third-party channel (such as social media activity via posts, images, comments, tags, etc.), and the like.

User database 242 may store advertiser-specific information, that is, information related to onsite activity by the user at the advertiser's website. It will be understood of course that the data is not limited to activity on a website but may include any interaction with the advertiser, such as use of the advertiser's application, or engagement with the advertiser over social media. The data in user database 242 may indicate, for example, whether and when a user accessed the advertiser's site, and what actions they took there, such as, e.g., purchase history, search history, account creation, and information from a user profile or that is otherwise shared with the advertiser such as, e.g., demographic data about the user, such as age, gender, location, language, and device information, GPS or location data, operating system, browser, or other device data, user preferences, and the like. In some embodiments, where the advertiser provides a platform for property rental, the user database 242 may store information about the customer interactions with the platform, such as the customer's searches or filters for specific property characteristics, whether and how long a user views a property listing, whether the user views maps or searches within particular geographic regions, the frequency of user searches, and how any of these factors associates with the user's history of purchases/bookings, among other things.

Product database 244 may store advertiser-specific information related to the products offered for sale. Generally, information about a product may include information about the product itself (such as the price, features, seller, etc.) as well as information about the listing for that product (e.g., the popularity of the listing in terms of a number of views and/or a ranked popularity, or factors relating to the creativity and/or quality of the listing that would be attractive to a user, such as images of the product). In some instances, the product database 244 may also store information about the market in which the product exists, such as average prices or average length of listing availability within the market. This market information may be used, in some embodiments, to determine information about the supply and demand of products within the market (that is, if a product is unique or rare in the market, and how fast products may move (sell) therein).

In an exemplary embodiment, user database 242, product database 244, and system 11 as a whole are managed by the advertiser so as to be connected to a local network; however, other configurations may be possible in other embodiments, as long as system 11 is able to access data from the databases 242 and 244. Further, while the term "database" or "repository" is used with reference to systems 242, 244, and 330 and third-party systems 322 and 324, these components are not so limited nor is any particular form or configuration of data storage mandated, and the described "databases" may alternatively be an indexed table, a keyed mapping, or any other appropriate data structure.

With reference to FIG. 3, system 11 generates product recommendations based on a modifiable impression budget and a consideration of user intent. More specifically, the calculation of an exemplary base impression budget logic 224 for a product, a user intent value 222, and a dynamic budget allocation 226 is described herein.

An impression budget may be understood as a value or score specific to a product, that serves to define how many times the product can be advertised (that is, shown to a user as a personalized recommendation) before it is expected to be purchased. The purchase may be either an actual purchase or a constructive or assumed purchase, that is, a point at which the system assumes the product will be imminently purchased.

The system 11 initially calculates a base budget value, through use of impression budget logic 224. In a preferred embodiment, impression budget logic 224 uses a supervised learning model to produce an initial value for a particular product that can be used on all future dates (and later modified in real time for a particular product by the dynamic budget allocation logic 226 described below). The impression budget value is not necessary a dollar-value budget (though it may be, in some embodiments), but rather, acts as a count or score representing the remaining number of times the product may be advertised. As a result, in a case where the impression budget is 100, such budget does not necessary correspond to $100, or any currency value. The impression budget logic 224, in generating a base impression budget value, considers information particular to the market for the product, and information particular to the product itself, without consideration of factors particularly directed to a user to whom the product is to be recommended. The impression budget logic 224 therefore primarily pulls data from central repository 330 that was collected from the product database 224.

More specifically, the impression budget logic 224 may consider demand and supply at a market level, viz., a high-level or macro-level that is inclusive of but not specific to the product and product listing being considered. This data may include, for example, an average or median past booking rate for products falling within the market, an average availability rate (or a value representative thereof) of products in the market, and other information indicative of supply and demand in the market, e.g., if there are a large or small number of discrete products therein. The impression budget logic 224 may also consider features of the individual product listing specific to the product being considered, such as the product's price and features. In this regard, the price of a product may be dynamic, so as to change in real-time, however, there will still be a price associated with the product at any given time that the impression budget logic 224 is executed. In some instances, the logic 224 may consider a user, aggregated user, advertiser, or critic rating(s) or review(s) assigned to the product. The logic 224 may also consider creative or aesthetic qualities about the product listing which may serve to make the product more attractive to the user. For instance, a product listing containing more information about the product, more images of the product, or higher quality, variety, or resolution of images may correlate to an increased purchase of the product. In some embodiments, the more subjective or creative qualities of a product listing, such as image quality, are evaluated by a deep learning algorithms and/or an artificial intelligence. For example, a deep learning algorithm may be used to analyze and score image quality based on, e.g., resolution, angle, lighting, the inclusion of particular features of interest, variety of images, among other factors particular to the type of product.

The impression budget logic 224 may also consider information relevant to the popularity of the product at a micro-level, that is, the relative popularity (demand) of the particular product or product listing within its marketplace. This may include, e.g., how many views were made of the listing within a set relevant period of time (e.g., a day, a week, a month, etc.). The particular period of time may be chosen with specificity to the product, the market, and/or how frequently it is sold. In some instances, a product listing is ranked (e.g., by listing view, price, or other metric) against a larger set of products in the marketplace, such as all purchased/reserved products, or all available unique products. The logic 224 may also consider the number of similar (or relatively similar) products that may serve a similar purpose to the product being considered by the logic 224 so as to be an alternative product.

In some embodiments, impression budget model 224 may contain logic that applies machine learning techniques to identify, in real time or approaching-real time, the base budget or score. These predictive values may be based on, e.g., historical patterns in the product's market placement, and how demand for the product (or particular relevant features of the product) has shifted, among other things. The logic may then compute a predictive impression budget value using the considerations described above.

While the impression budget model uses information specific to the product and/or its market, an exemplary user intent logic 222 is directed to consideration of a user who has seen the product advertisement, and their predicted reaction thereto. The user intent logic 222 may use a supervised learning model that can learn user activities patterns based on user's profile and activities history. For each target user that has viewed an advertisement for a product, a user intent value can be calculated. The user intent value may be understood as a user's purchase intent value, that is, how likely they are to actually purchase the product. This value is used to counterweigh the base impression budget in the dynamic budget allocation logic's performance of a real-time impression budget calculation (described below). The user intent logic 222 for a particular user viewing an advertisement for a product is described herein.

The user intent logic 222 may be, in one embodiment, a floating value between 0 and 1, or a percentage value, indicating a probability that a user who has been delivered an advertisement for a product will purchase that product within a given time period, though any appropriate range of values may be used in different embodiments. In a preferred embodiment, the given time period is 24 hours, however, in other embodiments, a different predetermined time may be set in accordance with market appropriateness. The user intent logic 222 may consider, for example, information such as a user's online search history, their purchase history with the advertiser, their demographic, location, or profile information, and their engagement with the product. As one example, in a case where the user has repeatedly searched for the product or similar products, has indicated an interest in a product (or a feature relevant to the product) through related purchases or comments on social media, on a third-party website or application, or with the advertiser, or has spent time viewing the product listing on the advertiser's website, these factors may indicate a greater degree of likelihood of purchase than a user with less targeted activity, though of course many other factors may be relevant. In this regard, in determining a particular user's likelihood of purchasing a product, the user intent logic 222 may pull data from both the user database 242 and one or more of external databases 322 and 324, and/or from the central repository 330.

Based on the information generated by the user intent logic 222 and the impression budget logic 224 for a particular product, a real-time impression budget, specific to the product, can be calculated by the dynamic allocation budget logic 226. The real-time impression budget (described below as a value $R_i$ with respect to a particular product i) is used to generate a real-time booking value, to determine whether to present a particular product i to a user within a list of recommended results. It is noted that while the term "real-time" is used, the dynamic budget allocator logic 226 need not perform a continuous calculation, but instead, may in various embodiments execute its analysis of the data supplied from the user intent logic and the impression budget logic upon the request of the components of the system 11, or at a scheduled appropriate time.

The dynamic budget allocator logic 226 may use the following exemplary equation to calculate the real-time budget $R_i$ for a particular product i:

$$R_i = P_i * \left(B_i - \sum_{u \in Ui} (V_u)\right) \tag{1a}$$

Equation (1a) may alternately be expressed as the equivalent equation (1b):

$$R_i = [B_i - (V_1 + V_2 + \ldots + V_u)] * P_i \quad (1b)$$

where $R_i$ is its real time impression budget for the product i, $B_i$ is the base impression budget for the product i (provided by the impression budget model), $U_i$ is a set of users to whom an advertisement for the product i has been shown, $V_u$ is a user intent value of user u (who has been shown the advertisement), and $P_i$ is a boolean value that denotes if the product i has been purchased (0 if purchased, 1 if available).

Through use of this formula, the dynamic budget allocation logic 226 keeps track of an impression budget for a product as the budget changes, based on a real-time or close to real-time calculation. Changes to the impression budget may happen in one of three scenarios. First, if the product is purchased, the boolean value $P_i$, typically set to 1, will be set to zero (or almost zero), in which case the entire calculation for $R_i$ will amount to zero (or almost zero). This is because, in circumstances where the product being advertised is unique, once the product is sold, it is no longer available for purchase by any other user. Accordingly, the zeroing of the real-time impression budget indicates that the product (now unavailable) should no longer be included in a set of products to be recommended to any user. In some embodiments, if the product is returned or released, the impression budget will be reset to its base value (or to its value prior to zeroing) and the process continued.

Second, if an advertisement is shown to a user, the user intent logic 222 calculates a user intent value $V_u$, for that specific user u, and the user intent value is subtracted from the impression budget. In some embodiments, the delivery of an advertisement to the user may also come with an impression cost (that is, the cost of delivering an advertisement, either a monetary cost paid to a third party or a resource cost), in which case such impression cost, or a value representative thereof, may also be deducted from the impression budget. For instance, in a case where the user intent value $V_1$ is 0.5, and an impression cost is 3.5, a value of 4 will be subtracted from the base impression budget. In one embodiment, a separate value $V_u$ is calculated each time a user is advertised to, even if the same user is advertised to multiple times, such that a user viewing two advertisements for the product would have a relatively similar impact on the impression budget as two users viewing one advertisement apiece. This is because a user's intent may vary at different times, such that the value $V_u$ may be higher or lower upon different impressions to that user, necessitating a separate calculation. However, in alternate embodiments, the dynamic budget allocation logic 226 may consolidate or reconcile advertisements to a single user. In a preferred embodiment, the user intent for every user to whom the advertisement has been displayed will be freshly calculated (or re-calculated) after the delivery of an advertisement, however, other embodiments are possible where only the user intent of the user(s) to whom the most recent advertisement was delivered are considered. When the impression budget is eventually exhausted (that is, when the value $R_i$ reaches zero), the dynamic budget allocation logic assumes that, based on the advertisements for the product already displayed, it is likely that one of the advertised-to users will purchase the property within a certain amount of time (in some embodiments, 24 hours, or one week). Accordingly, the product will no longer be recommended and no further advertisements for the products are made.

Third, the base impression budget $B_i$ for a product i may be periodically updated to reflect changes in supply/demand information specific to the product or the market for the product. In some embodiments, this update happens at a regular interval predefined by the system 11. In alternate embodiments, a factor external to the product i (such as the sale or availability of a related product, updated information about the seller, or other market-driven data) may initiate the need for an update to the base impression budget $B_i$. In some embodiments, the real-time impression budget $R_i$ will be recalculated or updated based on product/market change even where it has previously been set to zero.

Put another way, the output of the impression budget logic 224 is input into equation (1a) as the value $B_i$. An output of the user intent logic 222 is input into the equation (1a) as one of the values $V_u$, with a different user intent value being generated for each user u among the set of users U that has seen an advertisement for the product i. As the product is advertised to a user, the values $V_u$ are generated and are subtracted from the base budget. A value $V_u$ will be higher for users that are more inclined to purchase the product, therefore, the dynamic allocation budget logic 226 may allow for a relatively large number of impressions to low-commitment users, a relatively small number of impressions to high-commitment users, or any appropriate combination thereof. If the product is, at any time, purchased, the value $R_i$ drops to zero, and no additional advertisement for the product is placement.

In an alternate embodiment, the dynamic budget allocator logic 226 may use the following exemplary equation for product i:

$$R_i = P_i * \left( B_i - \sum_{u \in Ui} (V_u * N_u) \right) \quad (2)$$

Equation (2) is nearly identical to the exemplary equation (1a), with the difference that, for each user u that has been shown an advertisement for the product i, a multiplier N has been applied to the calculated user intent $V_u$. The multiplier $N_u$ is a value representing an impression effect of the advertisement on the user u; that is, the impression or impact the advertisement had on the user. In some embodiments, this impression effect may be calculated by, e.g., the amount of times the user has spent viewing an advertisement, though other factors may be used in different embodiments. The value N may be, in some embodiments, a strong indicator of a user's interest in the product.

A separate real-time impression budget $R_i$ is calculated by the dynamic budget allocation logic 226 for each product that may potentially be advertised. When the marketing system 10 intends to display an advertisement to a user, the personalized recommendation logic 228 may generate a set of recommended products that may be advertised to the user, by referencing the calculated impression budget for each product.

In one embodiment, the personalized recommendation logic 228 may apply machine learning techniques to identify, in real time, a predictive set of one or more products available for purchase that are likely to be of interest to the user. The predictive analysis may be based on, for instance, user profile information and user activity (from real-time and historical data stored in the user database 242), listing features and the relation of those features to the market (from real-time and historical data stored in the product database 244), and the impression budget $R_i$ of each product i calculated by the dynamic budget allocation logic 226. In some embodiments, this information relied upon by personalized recommendation logic 228 is stored in the central repository 330 or another appropriate storage (where the dynamic budget allocation logic 226, user intent logic 222, and/or impression budget logic 224 store their respective calculations in the central repository 330), and in alternate embodiments, personalized recommendation logic 228 may obtain information directly from any of the databases 242, 244, 322, and 324.

In some embodiments, the personalized recommendation logic 228 may generate a set of recommended products and display those products to the user. The results may be displayed, in some embodiments, as a sorted or ranked list. The ranking of this list may be performed based on user preferences, or based on, in different embodiments, price, relevance to search results, distance from user, or any other appropriate factor. In some instances, the personalized recommendation logic 228 may select one product of the generated set of recommended products to display in an advertisement to the user. This selected product may, in one embodiment, be the cheapest of the products included in the recommended products, and, in another embodiment, the most popular product; however, different selections may be used in different embodiments.

Figure 4:
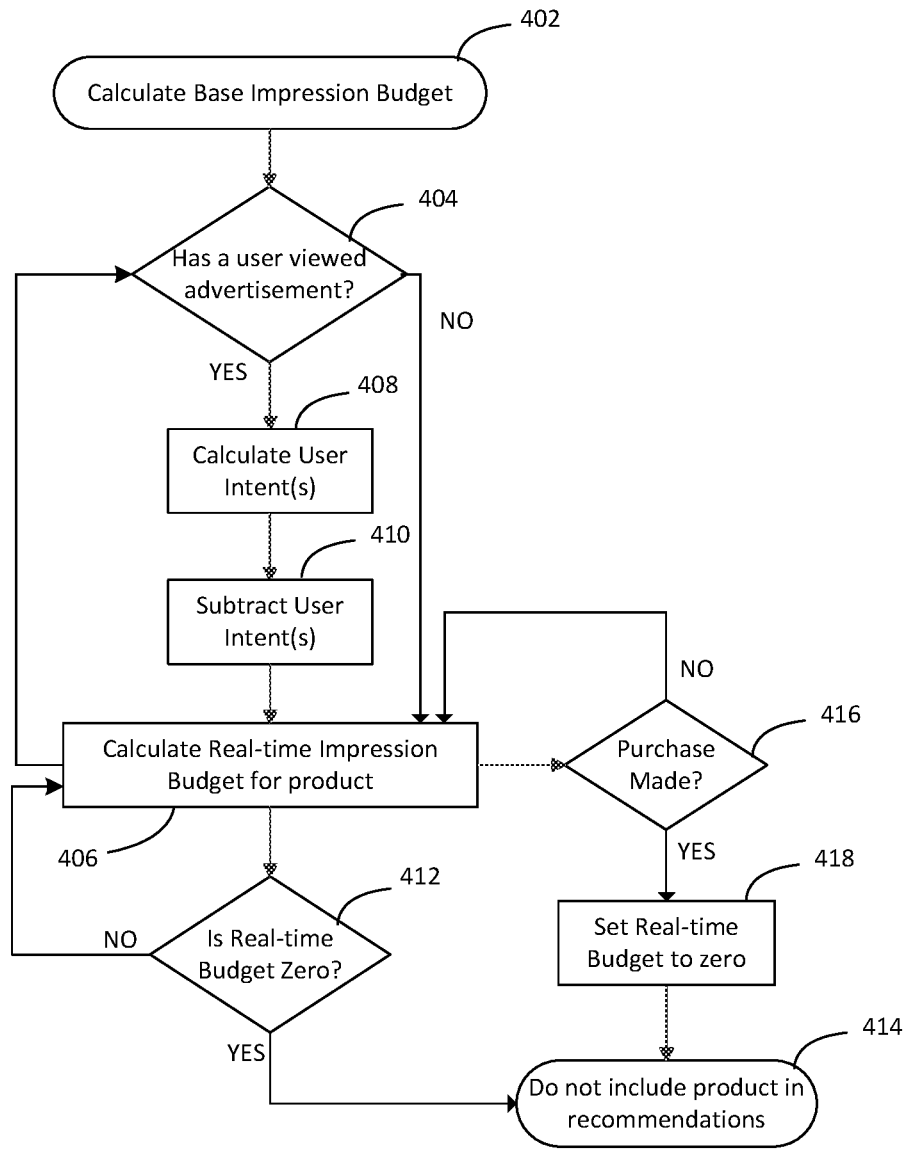
FIG. 4 is a flow chart illustrating an exemplary method of calculating an impression budget for determining whether to recommend a particular product to a customer.

FIG. 4 illustrates an exemplary process of managing an impression budget value. In the example of FIG. 4, the advertiser is a supplier of an online reservation system, in which a property, such as a home, an apartment, a room, or other real estate is marketed, though of course, any type of advertiser with any type of product or service may be used, provided the advertised products are scarce or unique in some manner. In the exemplary embodiment of FIG. 4, the user may book the property for rental for a period of days, weeks, or months. Therefore, the unique product, in this embodiment, is a property reservation on one particular calendar date.

In this embodiment, the impression budget logic 224 may consider information about individual reservable properties, such as base and real-time prices or price ranges, available dates, locations, number of bedrooms/bathrooms, service fees, number and quality of images of the property, and/or other factors that may be of interest to guests in making a reservation. In some embodiments, the product database 244 may also contain information such as, e.g., information about the market in which the property is located, a number of views of the listing or views within a period of time (e.g., day/week), and a relative ranking of the property among available or comparable listings, among other things. Such a ranking may be based on, for example, a number of views by different users, or a price range. In such an embodiment, the impression budget logic 224 may also consider market information, where the market is the geographic market (city or country, etc.) or the available listings within a certain date range, and the relevant market information includes, e.g., supply/demand within the market, or an average booking rate or availability rate for the market as a whole. By these means, a base impression budget is calculated in Step 402.

The property may be recommended to one or more users through a graphical advertisement that shows an image of the property, its location, and/or its rental price (though any type of advertisement or suggestion is possible). The exemplary process determines whether an advertisement has been made (Step 404), and if none has, the process proceeds to Step 406. If the property has been advertised (YES in Step 404), the user intent logic calculates a user intent value (from 0-1) indicating how likely it is that the user that received the advertisement will book the property within 24 hours. In its calculation of a user intent value(s) (Step 408), the user intent logic 222 may consider information such as a user's search or booking history, their user profile, or other relevant information. In addition, third-party data regarding activity on travel sites or social media or third-party websites may indicate an interest in a particular property or features of the property such as its location, prices, or dates or availability. Any or all of these factors may weigh into the analysis of a user's intent to book. The user intent value may also include a cost of advertising to the user.

Once an intent value is calculated for the user, the dynamic budget allocation logic 226, in Step 410, subtracts the user intent value from the base impression budget calculated by the impression budget logic 224 (Step 402). By these means, the dynamic budget allocation logic 226 generates an updated real-time impression budget (Step 406). If, at any time, the real-time impression budget for the property is sufficiently high so as to cover the cost of advertising on a marketing channel, the personalized recommendation logic 228 will consider the property in its determination of whether and which properties to advertise to a particular user. The process then cycles back to Step 404 and ultimately, would calculate an updated real-time impression budget.

When, after a series of advertisements, the real-time impression budget for the property reaches a value of zero (Step 412), the property is considered unavailable (or imminently so), and the property will no longer be included in a list of properties to be advertised to the user (Step 414). Additionally, if the property has been confirmed to have been booked/purchased (Step 416), the impression budget is set to zero (Step 418) and the product will no longer be advertised (Step 414). On the next calendar day, the property reservation for that new day is considered a new product, unique from the previously-advertised product, and a new base impression budget is calculated therefor.

By these means, advertisements are not limited to popular products, so that more unique products may be advertised. Further, advertisements to a target user are limited to products actually available for purchase, maximizing the probability that the product is available for purchase, and mitigating customer disappointment. Further, by use of personalized recommendation and the calculation of user intent, products of particular interest to the target customer are included in the generated recommendations. By these means, the recommendations need not be limited to the most broadly popular or least popular products.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for real-time transmission of a web-based advertisement for a single-quantity product from an advertiser to a user via a digital advertising channel, the method comprising:
    collecting a set of user activity data relating to user activity with an advertiser from a database, the user activity data includes a search history of the user with the advertiser and a purchase history of the user with the advertiser, and wherein user activity data is stored in the database in association with information related to (a) one or more products of the advertiser and/or (b) one or more advertisement communications of the advertiser;
    creating a training set comprising the set of user activity data;
    training a machine learning model using the training set to generate a user intent value;
    obtaining, from a memory, a target advertisement for a single quantity product from the advertiser for transmission to the user via the digital advertising channel;
    storing, in a memory, a market-level characteristic relating to the product and a product-specific characteristic of the product;
    calculating, by a processor, a base budget for the product based on the market-level characteristic and the product-specific characteristic;
    transmitting, by the processor, the target advertisement for the product to the user via the digital advertising channel;
    calculating, by the processor, using the machine learning model, the user intent value from a viewing of the target advertisement for the product by the user, wherein the calculated user intent value reflects the user's predicted likelihood to purchase the product based on the target advertisement;
    determining, by the processor, whether the product has been sold;
    calculating, by the processor, a budget allocation for the product, wherein calculating the budget allocation includes:
        subtracting the calculated user intent value from the calculated base budget for the product to generate the budget allocation; or
        setting the budget allocation to zero upon the determination that the product has been sold;
    in a case that the budget allocation is equal to zero, determining not to transmit the target advertisement to a second user via the digital advertising channel; and
    in a case that the budget allocation is a value greater than zero:
        (i) transmitting, by the processor, the target advertisement to the second user via the digital advertising channel; and
        (ii) recalculating, by the processor, the budget allocation for the product based on a user intent value calculated from a viewing of the advertisement by the second user so as to decrease the value of the budget allocation, wherein the calculated user intent value for the second user is different from the calculated user intent value for the user.

2. The method of claim 1, wherein the product is a listing for a single day rental of a property.

3. The method of claim 1, wherein the calculation of the budget allocation for the product is further based on an identification of the digital advertising channel for the advertisement.

4. The method of claim 1, wherein the recalculating is performed in accordance with (a) a total number of times the product has been advertised to any of a plurality of users and (b) for each of the times the product has been advertised to one user of the plurality of users, a calculated user intent value for that user.

5. A system comprising:
    a memory, wherein the memory is configured to store a product characteristic relating to a single-quantity product, a user characteristic relating to the activity of a user on a digital platform associated with the single-quantity product, and one or more machine learning models to generate an intent value using information stored in the memory;
    at least one processor coupled to the memory, the at least one processor being configured to execute instructions stored in the memory to:
    (a) calculate, based on the product characteristic, a budget value for the single-quantity product, the budget value being associated with a number of times the product may be advertised to any of a plurality of users via any of a plurality of digital advertising channels;
    (b) determine whether the product has been advertised to a user of the plurality of users;
    (c) calculate, in a case that the product has been advertised to a user of the plurality of users, using the one or more machine learning models, a first intent value indicating a predicted likelihood of the user to purchase the product, based on the user characteristic for that user;
    (d) subtract, from the calculated budget value, the calculated first intent value, so as to generate an updated budget value;
    (e) in a case that the updated budget value is equal to zero, determining not to deliver an advertisement to any of the plurality of users via any of the plurality of digital advertising channels;
    (f) in a case that the updated budget value is a non-zero value, deliver a web-based advertisement for the product to any of the plurality of users via a digital advertising channel and repeating steps (b)-(f) until the updated budget value is equal to zero, wherein each calculated intent value is unique to a corresponding user of the plurality of users.

6. The system according to claim 5, wherein the at least one processor is further configured to execute instructions stored in the memory to:
    determine if the product has been purchased; and
    in a case that the product has been purchased, set the budget value to zero.

7. The system according to claim 5, wherein the product characteristic includes one of: a price of the product, a feature of the product, a ranking of the product among other available products, and a market comparison of the product to the similar product.

8. The system according to claim 5, wherein the product characteristic includes one of: a market-level analysis of the commercial market to which the product belongs, an average price of a product within the commercial market, and a value indicating a supply or demand of products within the commercial market.

9. The system according to claim 5, wherein the user characteristic indicates one of: demographic information of the user, a user's purchase history, a user's activity on the digital platform, and a user's activity over a third-party digital platform.

10. The system according to claim 5, wherein the memory further stores a market characteristic relating to market-specific information, and
wherein the at least one processor is further configured to execute instructions stored in the memory to:
update the budget value in accordance with the market characteristic.

11. The system according to claim 5, wherein the at least one processor is further configured to execute instructions stored in the memory to:
determine whether the product has been advertised to a second user of the plurality of users;
calculate, using the one or more machine learning models, in a case that the product has been advertised to a second user of the plurality of users, a second intent value indicating a predicted likelihood of the second user to purchase the product, based on a second user characteristic, the second user characteristic being stored in the memory, wherein the second intent value is different from the first intent value;
subtract, from the updated budget value, the calculated second intent value;
in a case that the updated budget value is equal to zero, determining not to deliver an advertisement to any of the plurality of users via any of the plurality of digital advertising channels;
deliver, in a case that the updated budget value is a non-zero value, a web-based advertisement for the product to any of the plurality of users via a digital advertising channel.

12. A method performed by a computer system connected, via a network, to a remote server, the method comprising:
(a) obtaining, from the remote server, a first set of user metrics relating to the delivery of advertising content to a user via any of a plurality of digital advertising channels;
(b) obtaining, from a memory of the computer system, a second set of user metrics relating to user activity on the computer system via any of the plurality of digital advertising channels;
(c) creating a training set comprising the first set of user metrics and the second set of user metrics;
(d) training a machine learning model to generate a user intent value using the training set;
(e) obtaining, from a memory of the computer system, information relating to a single-quantity property listing;
(f) calculating a base budget allocation B for advertisement of the property listing via any of the plurality of digital advertising channels, based on the information relating to the property listing;
(g) delivering a web-based advertisement to a plurality of users U, the delivery being respectively performed for each of the plurality of users U via any digital advertising channel of the plurality of digital advertising channels;

(h) calculating, using the machine learning model, for each user u of the plurality of users U, a user intent value $V_u$ indicating the user's predicted likelihood of booking the property listing, wherein each user intent value is unique to the user;
(i) calculating a revised budget allocation R for advertisement of the property listing via any of the plurality of digital advertising channels, the calculating being performed in accordance with the following formula:

$$R = P * \left( B - \sum_{u \in U} (V_u) \right)$$

where R is a revised budget allocation for advertisement of the property listing, B is the calculated base budget allocation for the product, U is the plurality of users to whom advertisements for the property listing have been delivered, $V_u$ is the calculated user intent value of a respective user u of the plurality of users U, and P is a boolean value that denotes if the property listing has been booked;
(j) determining, in a case that R is equal to zero, not to transmit the advertisement for the property listing to any user of the plurality of users U; and
(k) delivering the advertisement for the property listing to a user in the case that R is a non-zero value.

13. The method of claim 12, wherein the property listing is a listing for a single day rental of a property.

14. The method according to claim 12, wherein the information relating to a property listing includes one of: a base rental price, a real-time total price of the property at a calendar date, a service fee, a location of the property, a number of rooms in the property, and a characteristic regarding an image of the property.

15. The system according to claim 12, wherein the information relating to a property listing includes one of: an average rental price of property listings in a location of the property, and an average availability rate of property listings in the location of the property.

16. The method according to claim 12, wherein the second set of user metrics indicates one of: demographic information of a user, a location of the user, a language of the user, a user's booking history, the user's search history on the computer system, and a user's activity on the computer system.

17. The method according to claim 12, wherein the first set of user metrics indicates one of: demographic information of a user, device data of the user, the user's search history, the user's activity over a third-party digital platform, a value indicating an impression effect of an advertisement on the user, and a number of a times that the user has viewed a property listing.

* * * * *